US011880765B2

(12) United States Patent
Chen et al.

(10) Patent No.: US 11,880,765 B2
(45) Date of Patent: Jan. 23, 2024

(54) STATE-AUGMENTED REINFORCEMENT LEARNING

(71) Applicants: International Business Machines Corporation, Armonk, NY (US); University of Illinois at Urbana-Champaign, Urbana, IL (US)

(72) Inventors: Pin-Yu Chen, White Plains, NY (US); Yada Zhu, Westchester, NY (US); Jinjun Xiong, Goldens Bridge, NY (US); Kumar Bhaskaran, Englewood Cliffs, NJ (US); Yunan Ye, Hangzhou (CN); Bo Li, Champaign, IL (US)

(73) Assignees: International Business Machines Corporation, Armonk, NY (US); University of Illinois at Urbana-Champaign, Urbana, IL (US)

( * ) Notice: Subject to any disclaimer, the term of this patent is extended or adjusted under 35 U.S.C. 154(b) by 556 days.

(21) Appl. No.: 17/074,054

(22) Filed: Oct. 19, 2020

(65) Prior Publication Data

US 2022/0121921 A1 Apr. 21, 2022

(51) Int. Cl.
*G06Q 30/00* (2023.01)
*G06N 3/08* (2023.01)
*G06F 40/279* (2020.01)
*G06Q 40/06* (2012.01)

(52) U.S. Cl.
CPC ............ *G06N 3/08* (2013.01); *G06F 40/279* (2020.01); *G06Q 40/06* (2013.01)

(58) Field of Classification Search
CPC ......... G06N 3/08; G06F 40/279; G06Q 40/06
See application file for complete search history.

(56) References Cited

U.S. PATENT DOCUMENTS

| 6,247,001 | B1 | 6/2001 | Tresp et al. | |
|---|---|---|---|---|
| 10,878,505 | B1 * | 12/2020 | Blair | ....................... G06F 18/24 |
| 2018/0330281 | A1 | 11/2018 | Teller et al. | |
| 2019/0354885 | A1 * | 11/2019 | Li | ............................. G06N 3/08 |
| 2022/0058437 | A1 * | 2/2022 | Soni | ....................... G06N 20/10 |

OTHER PUBLICATIONS

Ma., S., et al., "State-Augmentation Transformations for Risk-Sensitive Reinforcement Learning", The Thirty-Third AAI Conference on Artificial Intelligence (AAAI-19), Jul. 17, 2019, pp. 4512-4519.

(Continued)

*Primary Examiner* — Alvin L Brown
(74) *Attorney, Agent, or Firm* — Scully, Scott, Murphy & Presser, P.C.; Daniel P. Morris

(57) ABSTRACT

A processor training a reinforcement learning model can include receiving a first dataset representing an observable state in reinforcement learning to train a machine to perform an action. The processor receives a second dataset. Using the second dataset, the processor trains a machine learning classifier to make a prediction about an entity related to the action. The processor extracts an embedding from the trained machine learning classifier, and augments the observable state with the embedding to create an augmented state. Based on the augmented state, the processor trains a reinforcement learning model to learn a policy for performing the action, the policy including a mapping from state space to action space.

20 Claims, 10 Drawing Sheets

(56) References Cited

OTHER PUBLICATIONS

Shi, S., et al., "A Multi-Scale Temporal Feature Aggregation Convolutional Neural Network for Portfolio Management", CIKM '19, Nov. 3-7, 2019, pp. 1613-1622.
Li, Y., et al., "Deep Robust Reinforcement Learning for Practical Algorithmic Trading", IEEE Access, Received Jul. 17, 2019, accepted Jul. 29, 2019, date of publication Aug. 2, 2019, date of current version Aug. 19, 2019, pp. 108014-108022, vol. 7.
Maeda, I., et al., "Deep Reinforcement Learning in Agent Based Financial Market Simulation", Journal of Risk and Financial Management, Received Feb. 28, 2020, Accepted Apr. 8, 2020, Published Apr. 11, 2020, pp. 1-17, 13 (4), 71.
Mosavi, A., et al., "Comprehensive Review of Deep Reinforcement Learning Methods and Applications in Economics", Preprints (www.preprints.org), doi:10.20944/preprints202003.0309.v1, Posted Mar. 20, 2020, pp. 1-43.
Honchar, A., "AI For Portfolio Management: From Markowitz To Reinforcement Learning", Retrieved from https://www.topbots.com/ai-for-portfolio-management/, Apr. 14, 2020, 29 pages.
NIST, "NIST Cloud Computing Program", http://csrc.nist.gov/groups/SNS/cloud-computing/index.html, Created Dec. 1, 2016, Updated Oct. 6, 2017, 9 pages.
Ye, Y., et al., "Reinforcement-Learning based Portfolio Management with Augmented Asset Movement Prediction States", arXiv:2002.05780v1 [q-fin.PM], Feb. 9, 2020, 9 pages (Grace Period Disclosure).
Cover, T.M., "Universal Portfolios", Stanford University, Oct. 23, 1996, 27 pages.
Li, B., et al., "On-Line Portfolio Selection wit Moving Average Reversion", Proceedings of the 29th International Conference on Machine Learning, 2012, 8 pages.
Gao, L., et al., "Weighted Moving Averag Passive Aggressive Algorithm for Online Portfolio Selection", 2013 Fifth International Conference on Intelligent Human-Machine Systems and Cybernetics, Aug. 2013, pp. 327-330.
Jiang, Z., et al., "Deep Reinforcement Learning Framework for the Financial Portfolio Management Problem", arXiv:1706.10059v2, Jul. 16, 2017, 31 pages.
Ding, X., et al., "Using Structured Events to Predict Stock Price Movement: An Empirical Investigation", Proceedings of the 2014 Conference on Empirical Methods in Natural Language Processing (EMNLP), Jan. 2014, pp. 1415-1425.
Nguyen, T.H., et al., "Sentiment analysis on social media for stock movement prediction", Expert Systems with Applications, 2015, pp. 9603-9611, 42(24).

\* cited by examiner

STATE-AUGMENTED REINFORCEMENT LEARNING

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): Reinforcement-Learning based Portfolio Management with Augmented Asset Movement Prediction States, Yunan Ye, Hengzhi Pei, Boxin Wang, Pin-Yu Chen, Yada Zhu, Jun Xiao, Bo Li, arXiv:2002.05780v1 [q-fin.PM] 9 Feb. 2020.

BACKGROUND

The present application relates generally to computers and computer applications, and more particularly to machine learning and reinforcement learning.

In machine learning, a machine such as a computer processor can automatically learn and improve from experience without being explicitly programmed. For instance, a machine can be trained and retrained based on data to perform a task such as making a decision. Some applications of machine learning may involve using information from various data sources. Such data sources can be diverse, for example, structured and unstructured, and dynamically changing. Machine learning based on such heterogeneous and/or non-stationary data can be challenging.

BRIEF SUMMARY

A system and method for augmented-state reinforcement learning can be provided. The method, in an aspect, can include receiving a first dataset representing an observable state in reinforcement learning to train a machine to perform an action. The method can also include receiving a second dataset. The method can further include training a machine learning classifier using the second dataset to make a prediction about an entity related to the action. The method can further include extracting an embedding from the trained machine learning classifier. The method can further include augmenting the observable state with the embedding to create an augmented state. The method can further include, based on the augmented state, training a reinforcement learning model to learn a policy for performing the action, the policy including a mapping from state space to action space.

A system, in one aspect, can include a hardware processor and a memory device coupled with the hardware processor. The hardware processor can be configured to receive a first dataset representing an observable state in reinforcement learning to train a machine to perform an action. The hardware processor can also be configured to receive a second dataset. The hardware processor can also be configured to train a machine learning classifier using the second dataset to make a prediction about an entity related to the action. The hardware processor can also be configured to extract an embedding from the trained machine learning classifier. The hardware processor can also be configured to augment the observable state with the embedding to create an augmented state. The hardware processor can also be configured to, based on the augmented state, train a reinforcement learning model to learn a policy for performing the action, the policy including a mapping from state space to action space.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Systems and methods are disclosed which can improve machine learning methodology. For example, methodologies disclosed herein can be applicable for machine learning in which learning a task can involve data that is heterogeneous, have different structures, and/or are frequently changing. In one or more embodiments, the systems and methods can implement machine learning based predictors to handle such heterogeneous and/or changing data in learning a task more accurately and model them as augmented states for reinforcement learning. For example, in one or more embodiments, embeddings of machine learning predictors can be used as augmented states in machine learning such as reinforcement learning.

Predicting or classifying tasks accurately via machine leaning can include sequentially optimizing decisions based on continuous derivation of information from various data sources. Methodologies disclosed herein can address challenges in machine learning due to data heterogeneity (e.g., information pertaining to features is diverse, noisy and imbalanced) and/or environment uncertainty (e.g., versatile and non-stationary information over time). For example, machine learning methodologies disclosed herein may augment feature information with their data movement prediction as additional states, where the movement prediction can be derived from various sources.

In an aspect, using embeddings from machine learning models can help in handling diverse data such as unstructured data and heterogeneous data. Such embeddings can allow for combining data in a unified way, for example, convert data to a state that an automated agent (e.g., a machine learning model) can use in performing or learning to perform a task. The methodology disclosed herein allows for handling diverse data, noise in data, imbalanced distribution of different sources of data (fresh augmented state when there is a news), and/or uncertainty in data (incorporate heterogeneous information for robust task performance). Embeddings can represent high-level information from data and can reduce noise. General state-augmented machine learning framework such as a state-augmented reinforcement learning framework can be applicable to different reinforcement learning training pipeline.

Figure 1:
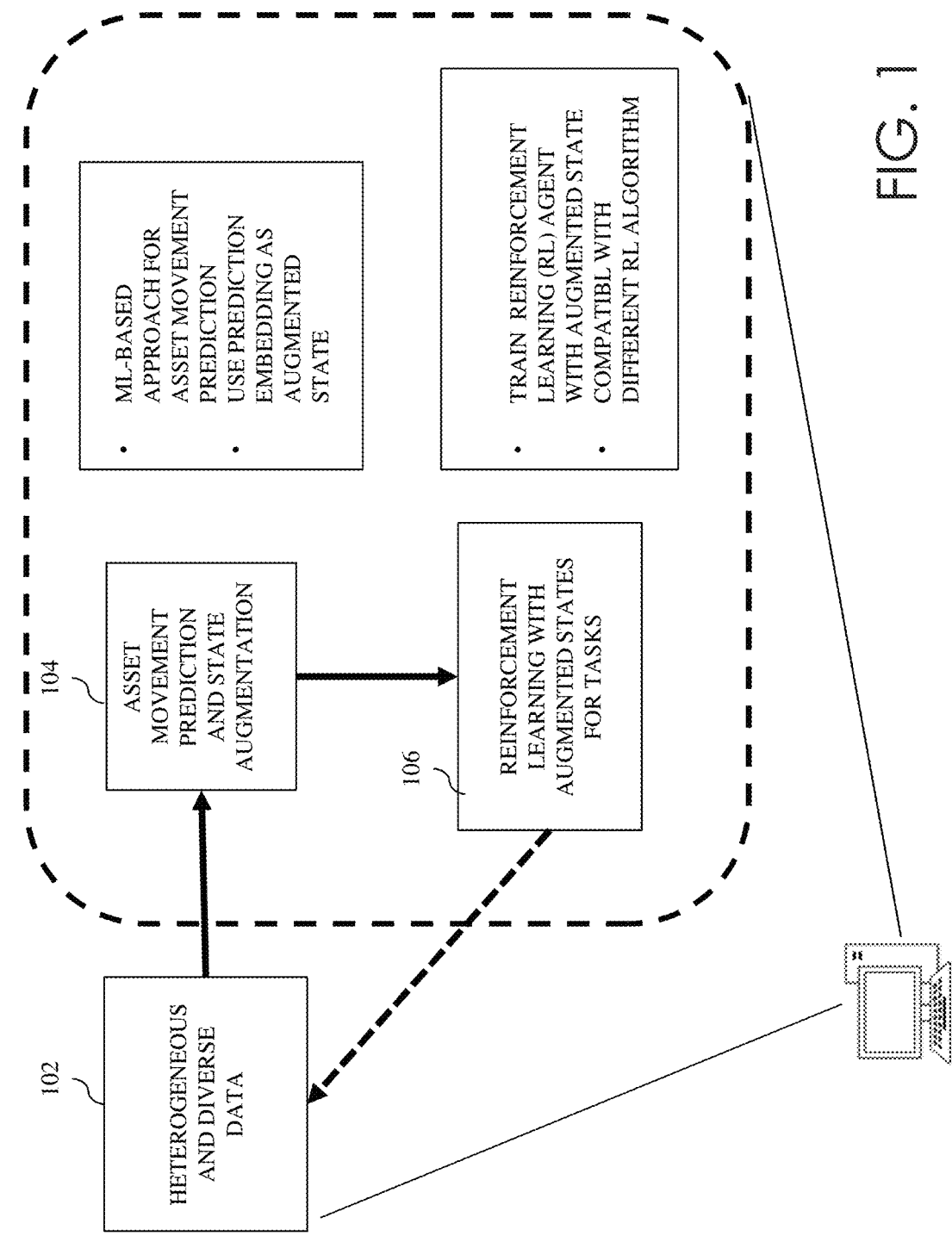
FIG. 1 is a diagram illustrating an overview of augmented-state machine learning in an embodiment.

FIG. 1 is a diagram illustrating an overview of augmented-state machine learning in an embodiment. The components shown include computer-implemented components, for instance, implemented and/or run on one or more processors such as hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

Data 102 can be received, for example, from heterogeneous and/or diverse data sources. In an embodiment, there is no limitation on the data types, which can be provided. In an embodiment, there is no limitation on the data structure, for example, data can be converted into learned embeddings or pre-trained embeddings. Numeric data can be normalized and preprocessed and used as states for machine learning such as reinforcement learning. Unstructured data can have additional embedding step to map the information to numeric values. Examples of different data can include prices (e.g., monetary units), tabular data (derived features), news or text data (converted into embedding), graph (converted into embedding), social media data including, but not limited to text, image and video.

Asset movement prediction and state augmentation at 104 can include training machine learning classifiers or predictors to predict data movement. This component 104, for example, can use the prediction embeddings (e.g., labels and/or latent codes) of an information source (e.g., prices, news) from such trained machine learning classifiers or predictors as an augmented state, for example, in reinforcement learning. Examples can include, but are not limited to training an item (e.g., stock) price movement predictor using past prices, training an item (e.g., stock) price movement predictor using news information (e.g., financial news information). For example, state space for reinforcement learning may be enlarged to include embeddings.

State-augmented RL (SARL) for tasks 106 can include RL-based training with the augmented state or states. In an aspect, the state-augmented RL framework can integrate heterogeneous data sources into RL training pipelines (e.g., standard RL training pipelines) for learning strategies or tasks. By way of example, an RL-based machine learning model, for performing a task of portfolio allocation can be trained with augmented states involving news and price as input to output an action on asset allocation. The state-augmented RL framework disclosed herein can be compatible with current RL training pipeline.

By way of example, improved machine learning disclosed herein can be performed for financial planning using state-augmented RL. An embodiment of the financial planning is for portfolio management. For example, different machine learning classifiers can be built to predict different asset movements. The predicted asset movements can be embedded as augmented states for RL. The augmented states can be combined with other applicable states, and an RL-based model can be trained to learn asset allocation policies for portfolio management. The trained model in this way is able to handle heterogeneous, diverse and noisy data by combining financial news and stock prices.

The following illustrates state-augmented RL with portfolio management (PM) as an example task. While the description explains the state-augmented RL disclosed herein using portfolio management as an example task, such state-augmented RL methodology can be applicable to other tasks, not limited to PM or financial planning tasks.

Portfolio management (PM) is a financial planning task that aims to achieve investment goals such as maximal profits or minimal risks. Its decision process involves continuous derivation of valuable information from various data sources and sequential decision optimization. Reinforcement learning (RL) in machine learning (ML) can provide automatic or autonomous process for such decision making. A state-augmented RL framework disclosed herein can be applicable for PM. Such framework can address challenges such as data heterogeneity (e.g., the collected information for each asset is diverse, noisy and imbalanced (e.g., news articles); and environment uncertainty (e.g., the financial market is versatile and non-stationary). For example, to incorporate heterogeneous data and enhance robustness against environment uncertainty, SARL augments the asset information with their price movement prediction as additional states, where the prediction can be solely based on financial data (e.g., asset prices) or derived from alternative sources such as news. Examples of assets can include stocks in portfolio managements. Other examples of assets can include bitcoin, for example, in bitcoin market. By way of example, real-world news articles collected over time is an example of a generated augmented state, which can be used in SARL. Experiments and simulations demonstrate that state augmentation in RL disclosed herein can provide new insights and boost performance of machine learning prediction, for example in PM and others.

Figure 2:
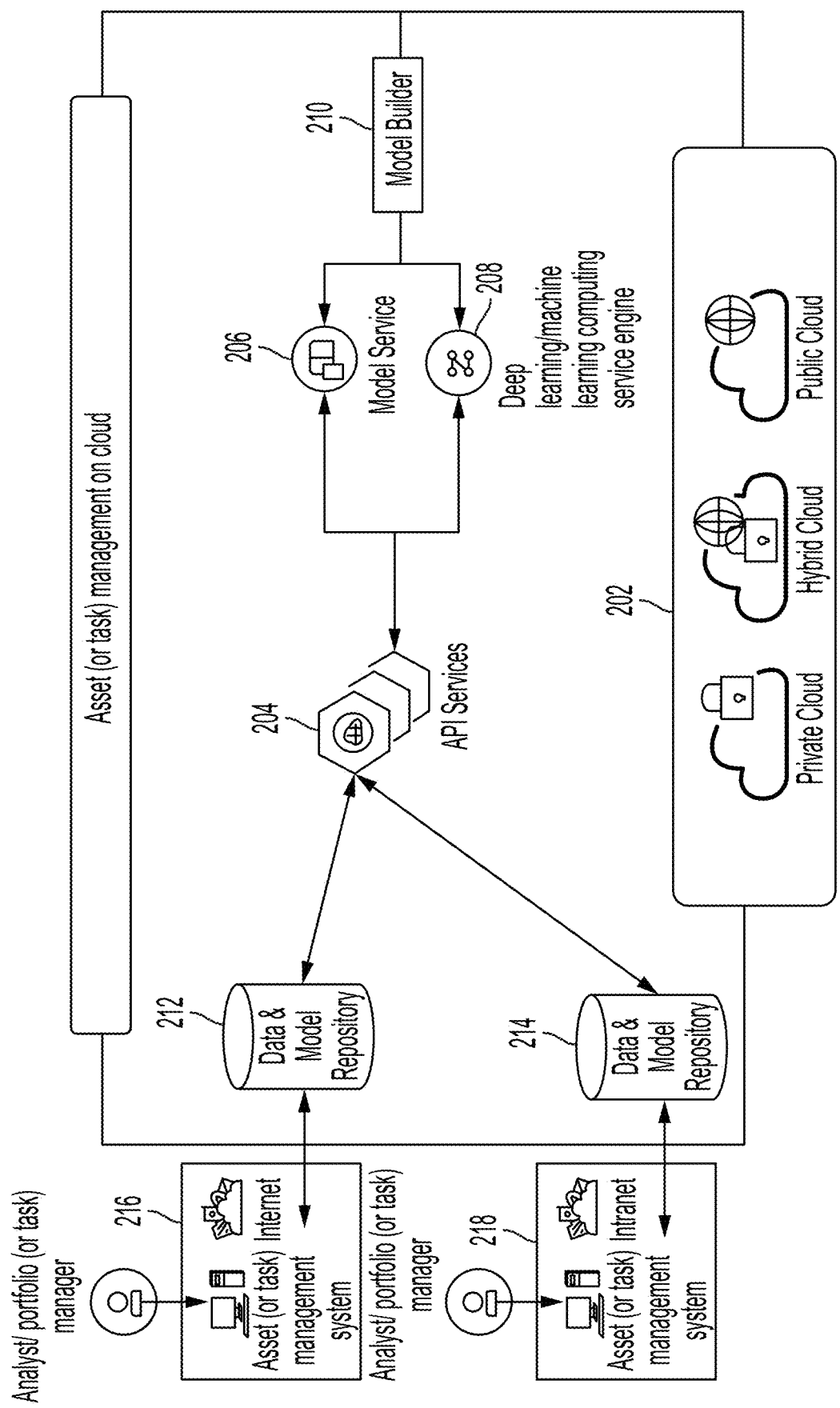
FIG. 2 is a diagram illustrating a computing environment implementing a methodology in an embodiment.

FIG. 2 is a diagram illustrating a computing environment implementing a methodology in an embodiment. The computing environment can be a cloud-based computer system and include an API service. For example, a state augmented RL model building and inferencing can be offered via one or more private cloud, hybrid cloud and/or public cloud-based computers 202, and/or via one or more application programming interface (API) services 204. A model service 206 and/or a machine learning computing service engine 208 may allow a user to request model building and/or inferencing via the cloud-based computer system 202. Such model service 206 and/or a machine learning computing service engine 208 may employ a model builder 210 to build a state augmented RL model. The built model and/or any related data can be stored in a data repository 212, 214 accessible by a user. One or more users such as an analyst may run a front-end application or a web browser on the user's computer system 216, 218 to access the cloud-based and/or API-based service to build and run a state-augmented RL model.

Figure 3A:
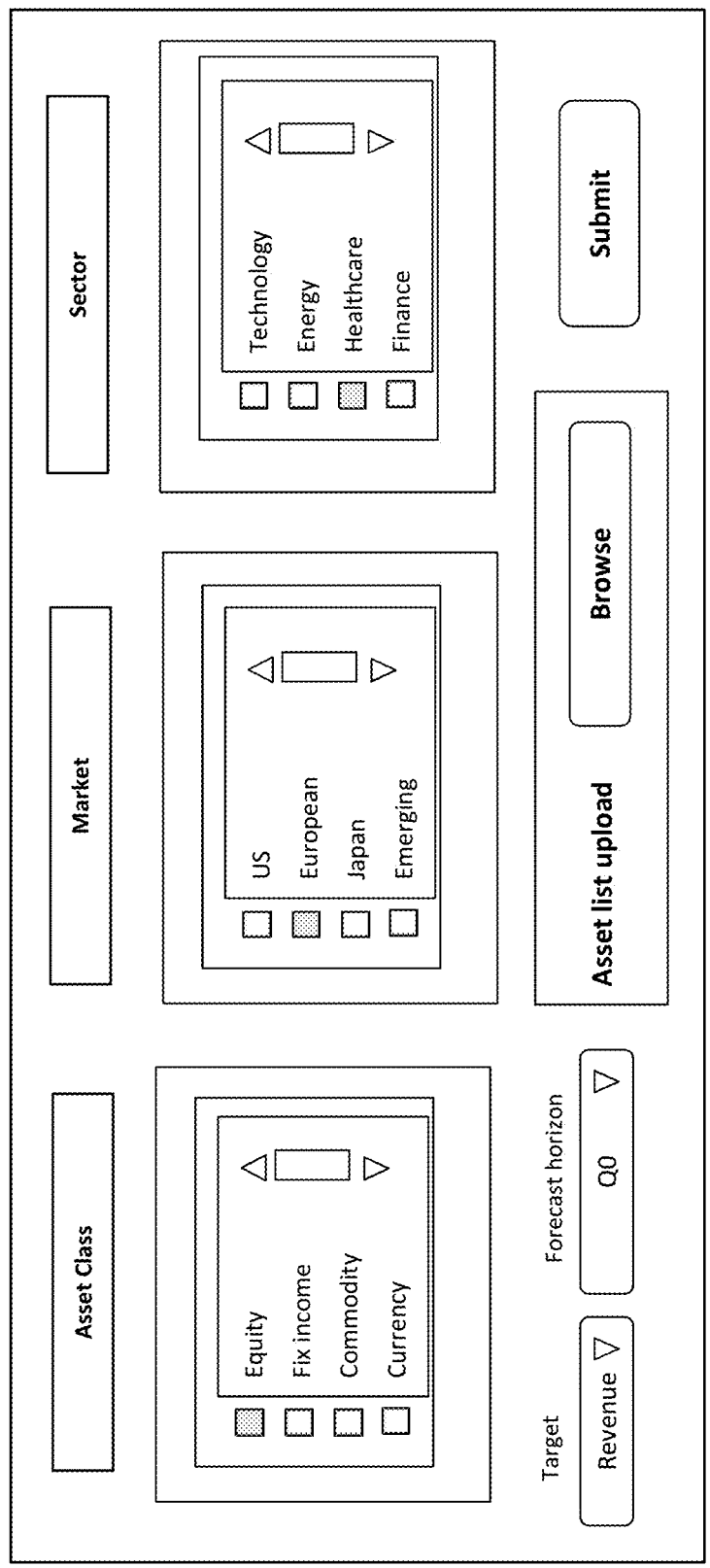
FIGS. 3A and 3B illustrate example user interface screen displays in an embodiment.
Figure 3B:
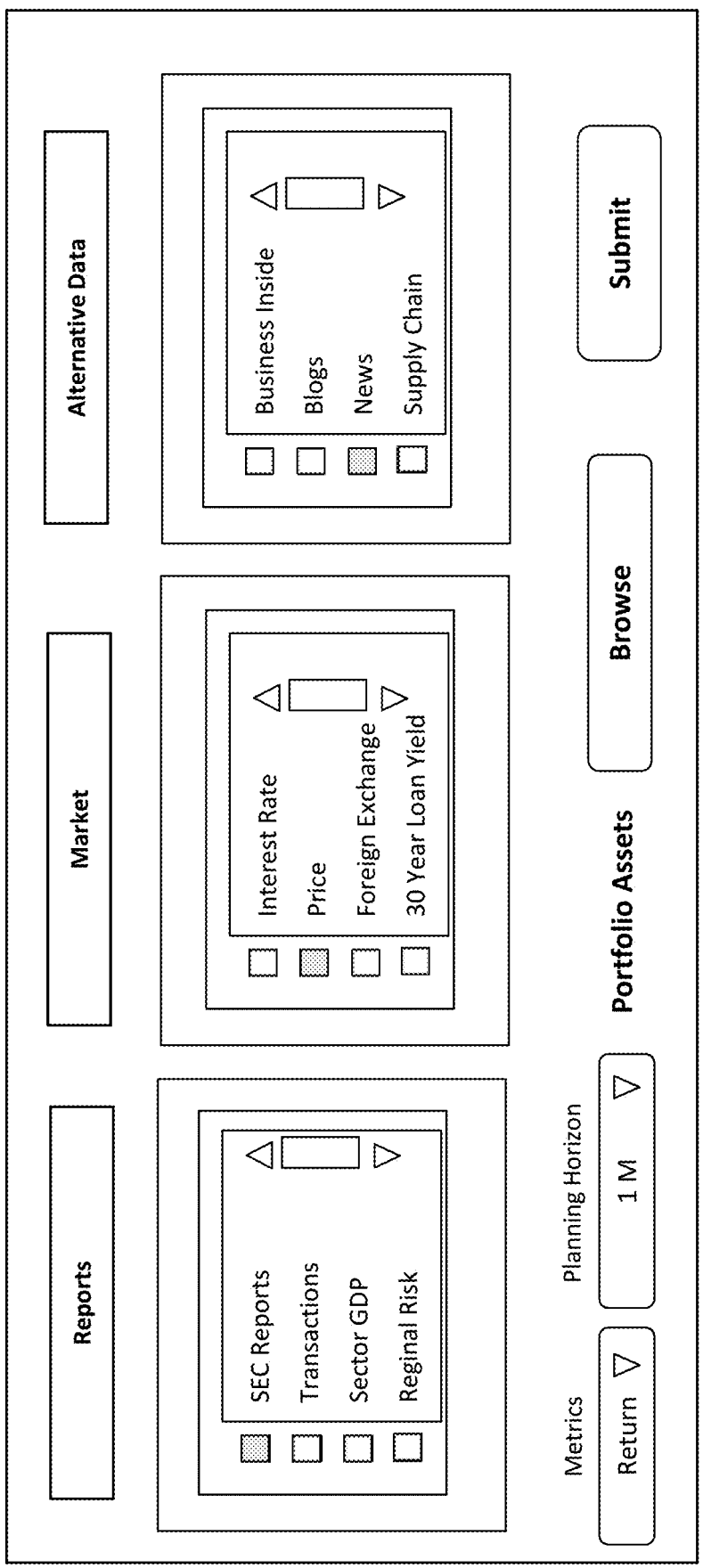

FIGS. 3A and 3B illustrate example user interface displays in an embodiment. For instance, the user's computer system (shown in FIG. 2 at 216, 218) may display or present such user interfaces for allowing a user to provide input data associated with building and/or running a state-augmented RL model. For instance, shown in FIG. 3A, a user may input options such as asset class, market and sector, target revenue and forecast horizon (time frame), and/or a list of assets, for the state-augmented RL to consider and train a model. As another example, a user interface such as shown in FIG. 3B can allow a user to input information such as reports, market and alternative data, information such as metrics and planning horizon, and/or asset portfolio, to consider in training a model.

An investment portfolio includes a basket of assets that can hold stocks, bonds, cash and more. An investor's success can rely on maintaining a well-balanced portfolio. Portfolio management is largely based on linear models and Modern Portfolio Theory (MPT). MPT relies on accurate prediction of market prices and restricted assumptions such as past probability distribution of assets returns fully representing the future. Accurate market price forecast can be challenging due to its highly noisy, stochastic and chaotic nature. Portfolio management involves sequential decision making of continuously reallocating a number of funds into assets based on the latest information to achieve the investment goal. While reinforcement learning (RL) can be applied to model the decision making process for asset reallocation, data heterogeneity and environment uncertainty can make the RL learning process challenging. For instance, data heterogeneity, in which the collected information for each product may be sparse, noisy, imbalanced, and diverse (e.g., financial time series vs. unstructured data, news articles), can make it difficult to incorporate different information within the single model. Environment uncertainty, which can be characterized by the non-stationary nature of financial markets, can induce uncertainty and cause a distribution shift between training and testing data in machine learning.

A state-augmented RL (SARL) framework disclosed herein, for example, applied to portfolio management can leverage additional diverse information from alternative sources other than classical structured financial data, such as asset prices, to make market trend prediction. Such prediction can then be incorporated into an RL framework for state augmentation. In an embodiment, SARL is a general framework in the sense that it can incorporate different sources of information into the augmented states. It is also not restricted to any particular market. Examples disclosed herein refer to information sources such as the asset price, the financial data, and news articles of different products (companies), and alternative data.

A state-augmented RL framework (SARL) uses additional information from different sources to make prediction (e.g., market prediction) and such prediction are embedded as augmented states in the RL framework to improve the performance of RL or RL's task, for example, PM performance. By using augmented states methodology, the RL framework can incorporate high-density (more frequent) external information (e.g., even information that is noisy) and low-density but high-accuracy external information in machine learning or reinforcement learning process.

Figure 4:
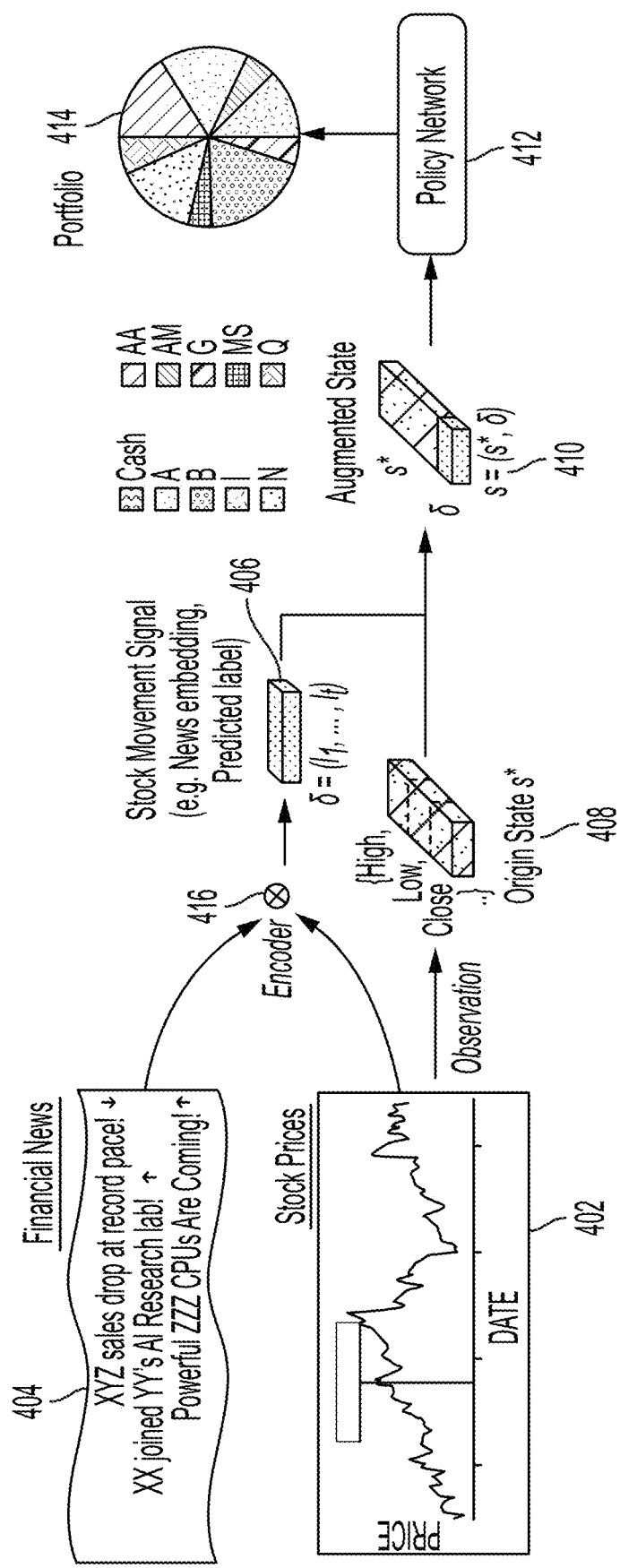
FIG. 4 illustrates a framework of state-augmented reinforcement learning (SARL) in an embodiment.

FIG. 4 illustrates a framework of state-augmented reinforcement learning (SARL) in an embodiment. By way of example, asset prices (e.g., stock prices) 402 represent the internal features constituting the original state s* 408, and financial news 404 represent the external information to be encoded and augmented to the final state s 410 for SARL. The asset movement signal δ 406 is used for state augmentation and the policy network 412 generates the portfolio management strategy 414 from the augmented state s 410. For example, the policy network 412 defines the learning agent's way of behaving at a given state. Other internal feature data and other external information can be encoded for reinforcement learning.

Portfolio management (PM) is a financial planning task that aims to maximize forecasted profits (or minimize calculated risks) via asset allocation. A market is made up of many assets and their related information, e.g., prices and other factors that affect the market. It may be assumed that the market is sufficiently liquid such that any transactions can be performed immediately with minimal market impact. For PM, there can be a machine learning algorithm that can gather all viable information from the market and then gradually improve its trading strategy by trial-and-error. The market including all the assets for PM and other available information can be referred to as the environment. Based on the liquidity hypothesis, an algorithm (which can run on one or more processors such as hardware processors) which observes the environment, makes decisions to interact with the market and rebalances the portfolio can be defined as an agent.

The environment may provide asset prices as an internal data source and may also provide financial news articles (when available) as an external data source. Such data sources can be received via a computer network and/or stored on a computer system. The agent can have access to all historical prices and news articles up to the current time step for making low-level predictions such as price changes or high-level predictions such as asset movements (up/down). An agent that gives accurate asset price change predictions is ideal, but it may be difficult to be trained in practice due to market uncertainties and possible distribution shifts between training (past market) and testing (future market) environments. On the other hand, predicting high-level changes such as asset movements may be an easier task, which in turn gives a more reliable predictive information when augmented with the asset prices for reallocating portfolios. Let $v_{i,t}$, i={1, . . . , n} denote the closing price of the $i^{th}$ asset at time t, where n is the number of assets to be considered for PM. The price vector $v_t$ includes the closing prices of all n assets. Similarly, $v_t^H$ and $v_t^L$ denote the highest prices and the lowest prices at time step t, respectively. For instance, t is an index of asset trading days. In PM problems, the assets may be not always fully invested.

In addition to the portfolio of n assets, the present disclosure introduces an additional dimension (the first dimension indexed by 0) in $v_t$, $v_{0,t}$, to denote the "cash price" at time instance t. As a methodology disclosed herein normalizes all temporal variations in $v_t$ with respect to cash value, $v_{0,t}$ remains constant for all t.

In an embodiment, the methodology may model the PM problem as a Markovian decision process which indicates that the next state only depends on current state and action. The methodology can formulate the PM problem as a triplet (S, A, r), where S is a set of states, A is a set of actions, and r: S×A→ℝ is the reward function.

To be akin to asset price changes over time, the methodology may denote $$y_t = \frac{v_{t+1}}{v_t}$$

as the relative price vector. More precisely, $$y_t = \frac{v_{t+1}}{v_t} = \left(1, \frac{v_{1,t+1}}{v_{1,t}}, \ldots, \frac{v_{n,t+1}}{v_{n,t}}\right)^T \quad (1)$$

To formulate the process of asset reallocation in PM, the methodology may introduce the reallocation weight fraction $w_t = (w_{0,t}, w_{1,t}, \ldots, w_{n,t})^T$ in the framework in an embodiment, where $w_{i,t}$, $t \neq 0$ is the weight fraction of the $i^{th}$ asset and $w_{0,t}$ is the weight fraction of cash at the end of time step t. The asserts are reallocated based on the weight assigned to each asset. So, for example, $\Sigma_{i=0}^{n} w_{i,t} = 1$.

In an embodiment of an implementation of a methodology disclosed here, the RL agent sells or buys assets based on the difference of $w_t$ and $w_{t-1}$ between time steps t−1 and t to reallocate the portfolio.

In an embodiment, SARL methodology can be used as a framework of deep RL with augmented asset movement prediction states. In an embodiment, the methodology disclosed herein may formulate the PM problem as a decision making process with heterogeneous data. The methodology in an embodiment may implement a hierarchical approach which binds supervised learning and RL into a unified framework such that it can be trained with standard RL methods, for example, as illustrated in FIG. 4.

An implementation of the methodology in an embodiment can employ an end-to-end network to extract asset movement information from either internal source (e.g., Price Up/Down Predicted label from historical prices) or external source (e.g., News embedding). The methodology may then integrate it with the prices of assets for state augmentation. The methodology may also adopt a deterministic policy gradient algorithm based on the augmented state for learning the policy of PM. The SARL framework disclosed herein in an embodiment can incorporate different data sources through the use of an encoder for state augmentation.

Augmented Asset Movement Prediction State

In an embodiment, the SARL framework is capable of incorporating heterogeneous data into the standard RL training pipeline. Referring to FIG. 4, an encoder δ 414 takes different types of data sources and transforms their contents into informative representations to be augmented to the asset prices for training an RL agent. For example, the encoder δ 414 can be a classifier that takes past asset prices over a certain period as inputs and produces asset movement predictions. Another example of an encoder δ 414 can be a feature extraction function derived from a text classifier, which is trained on the word embeddings of news for asset movement prediction. Overall, the augmented state is defined as $$s = (s^*, \delta) \quad (2)$$

where $s^*$ is the observable state (e.g., current asset prices) related to low-level observations and δ is the encoder summarizing high-level observations (e.g., asset movement prediction from past asset prices or news). In an embodiment, the augmented state includes the original state space augmented with the embedding or embeddings. For example, augmented state=[price, embedding of movement state from financial news]. As another example, augmented state=[price, embedding of movement state from price].

An embodiment of the SARL framework provides the flexibility to adopt the internal or the external information to augment the state. For internal information, the methodology in an embodiment can use past prices to predict the asset movement and then integrate the prediction result into the state. Augmenting asset movement prediction from past asset prices can offer additional high-level and robust information to improve decision making, which may not be apparent or sufficiently expressed when only using raw asset prices for RL.

For instance, the methodology in an embodiment can include training a recurrent neural network with long short-term memory (LSTM) to predict the asset movement. The binary output (price up/down) will guide the model to choose a better strategy. For external feature, the methodology in an embodiment can collect financial news articles related to the assets selected for PM, for instance, since they provide new but possibly correlated information for asset movement prediction in addition to asset prices. The methodology may use different kinds of Natural Language Processing (NLP) methods as encoders to embed the news and then feed the embedding into a hierarchical attention network (HAN) to train a binary classifier to predict the price movement. For example, the features in the last layer before the softmax layer are extracted to represent the embedding of the news. The methodology may integrate the embedding into the state for augmentation. An advantage of the state-augmented RL is its generality in incorporating heterogeneous data sources via encoders and its compatibility with standard RL training algorithms via state augmentation. Experiments indicate that state augmentation with either internal or external information improves the results produced in machine learning.

Deterministic Policy Gradient

Deterministic Policy Gradient (DPG) learns a deterministic target policy using deep neural networks. A policy is a mapping from the state space to the action space, $\pi_\theta : S \rightarrow A$. Policy gradient represents the policy by a parametric probability distribution $\pi_\theta(a|s) = P(a|s; \theta)$ that selects action a from action space in state s according to parameter vector θ. For a deterministic policy $\alpha = \mu_\theta(s)$, the selection is deterministically produced by the policy from a state. Since the return $r_t^\gamma$ is defined as the total discounted reward from time-step t onwards reward, $r_t^\gamma = \Sigma_{k=t}^{\infty} \gamma^{k-t} r(s_k, a_k)$ where r is the reward function and γ is the discount factor where $0 < \gamma < 1$. The methodology in an embodiment may define the performance objective as $J(\mu_\theta) = \mathbb{E}[r_1^\gamma | \mu]$, which is the expectation over the discounted state distribution $\rho^\mu(s)$ defined as $$J(\mu_\theta) = \int_S \rho^\mu(s) r(s, \mu_\theta(s)) ds \quad (3)$$
$$= \mathbb{E}_{s \sim \rho^\mu}[r(s, \mu_\theta(s))]$$

Considering the time interval from 1 to T, the corresponding performance objective function is $$J_T(\mu_\theta) = \Sigma_{t=1}^T \gamma^t r(s_t, \mu_\theta(s_t)) \quad (4)$$

The objective in (4) is the typical Markovian decision process objective function. It may be that this type of function does not match the portfolio management task due to the property that the asset accumulated by time t would be reallocated in time t+1. The methodology in an embodiment modifies the objective function, which makes it more suitable for the portfolio management task or like task. For example, the methodology may replace the summation by the accumulated product of the portfolio value $P_T = \Pi_{t=1}^{T} P_0 r_t$. Thus, in an embodiment, the performance objective becomes $$J_T(\mu_\theta) = J_0 \Pi_{t=1}^{T} r(s_t, \mu_\theta(s_t)), \quad (5)$$

where $J_0$ is a constant.

Action and Reward for Portfolio Optimization

Action(a). In an embodiment, the methodology may use fraction vector of the total assets at time step t, $w_t = \{w_{0,t}, w_{1,t}, \ldots, w_{n,t}\}^T$ to represent the allocation of the assets. The agent may reallocates the assets into assets, that is, adjust $w_{t+1}$. The desired reallocating weights at time step t, $a_t = \{a_{0,t}, a_{1,t}, \ldots, a_{n,t}\}^T$, with the constraint $\Sigma_{i=0}^{n} a_{i,t} = 1$, is the action vector in the model. By taking the action at time step t, the asset allocation vector would be influenced by the price movement $y_t$. At the end of the time period, the allocation vector $w_{t+1}$ becomes $$w_{t+1} = \frac{y_t \odot a_t}{y_t \cdot a_t} \quad (6)$$

where $\odot$ is the element-wise multiplication.

Reward(r). The reward function of each time step can be defined in a standard way based on profit the agent made. The fluctuation of the value of the assets for each asset is $a_{t,i} \cdot y_{t,i}$. Thus the total profit at time step t is $a_t \cdot y_t$. Taking transaction cost $\beta = \Sigma_{i=1}^{n} |a_{i,t} - w_{i,t}|$ into consideration, the immediate reward at time step t can be represented as:

$$r_t = r(s_t, a_t) = a_t \cdot y_t - \beta \Sigma_{i=1}^{n} |a_{i,t} - w_{i,t}| \quad (7)$$

The introduction of transaction cost makes the formulation close to the real market operation. Applying the approximation of $\beta$ which approximate $\beta_t$ with portfolio vectors of two recent periods and the price movement vector, the methodology gets $\beta_t = \beta_t(w_{t-1}, w_t, w_t)$. A fixed constant commission rate for non-cash assets trading is applied. The methodology sets $c_b = c_s = 0.25\%$ where $c_b$ and $c_s$ is the constant commission rate of buy and sell. Following the setting of the modified DPG, the target of the agent is to maximize the accumulated product value, which is equivalent to maximizing the sum of the logarithmic value. The methodology gets the modified reward function at time step t:

$$r_t = r(s_t, a_t) = \ln(\beta_t a_t \cdot y_t) \quad (8)$$

and the accumulative return R:

$$R(s_1, a_1, \ldots, s_T, a_T) = J_T = \frac{1}{T} \Sigma_{t=1}^{T} \ln(\beta_t a_t \cdot y_t) \quad (9)$$

Considering the policy $\mu_\theta$, a goal is to maximize the objective function parameterized by $\theta$, which can be formally written as below:

$$\mu_{\theta*} = \underset{\mu_\theta}{\mathrm{argmax}}\, J_T(\mu_\theta) \quad (10)$$

$$= \underset{\mu_\theta}{\mathrm{argmax}}\, \frac{1}{T} \Sigma_{t=1}^{T} \ln(\beta_t a_t \cdot y_t)$$

-continued $$\nabla_\theta \mu_\theta(\tau) = \frac{1}{T} \Sigma_{t=1}^{T} \nabla_\theta \ln \mu_\theta(a_t, s_t) \quad (11)$$

$$\theta \leftarrow \theta + \lambda \nabla_\theta \mu_\theta(\tau) \quad (12)$$

where $\lambda$ is the learning rate. Due to the existence of the denominator T, the equation is properly normalized for data with different length T, which also makes mini-batch training over a sampled time period feasible.

Experiments performed with respect to bitcoin dataset and also with respect to asset prices, for example, with additional source information such as news data, illustrate that the above-described reinforcement learning framework provide accurate results. For example, in addition to asset prices, unstructured data sources such as news data about different assets, which can be unbalanced in density or quantity among different assets, can be used as external information as converted to embeddings.

State augmention in SARL can address data challenges in machine learning such as unbalanced data distribution, noisy data and environment uncertainty. Unbalanced data distribution may occur since distribution of data sources such as news can be highly unbalanced across companies (or assets). For instance, company A can have x number of time more news than company B. In addition, the unbalanced news distribution can also occur across time, for example, each company is not guaranteed to have a related news article every day. More generally, not every state $s_t$ may have its corresponding external feature.

Noisy external data can occur since news can cover multiple topics, and there may be redundant information which may be irrelevant to portfolio management. In an embodiment, the methodology disclosed herein may train a text classifier hierarchical attention network (HAN). Different word embedding techniques, e.g., Glove, Word2Vec and Fasttext, can be used. The methodology may also adopt Auto Phrase for phrase mining and training a random initialized embedding network, for example, for stock movement prediction.

Environment uncertainty can occur in scenarios or applications where a machine learning is performed based data that is dynamic, e.g., changing over time, such as in PM which is influenced by market dynamics. For instance, the PM strategy of a standard RL agent trained on past market dynamics may not be generalizable to the future market if there are substantial changes in market dynamics (i.e., the problem of distribution shift). State augmentation disclosed herein may address such environment uncertainty.

As a use case of bitcoin dataset for portfolio management of cryptocurrencies, a classifier can be trained based on previous prices of past x number of days (e.g., past 30 days) to for price up/down prediction. For instance, a neural network based on LSTM can be implemented as an encoder. In another use case of stock dataset, the financial news related to stocks can be used for classifier training. For instance, word embedding technique such as Glove can be implemented or used and HAN can be implemented or used as an encoder to obtain an n-dimensional embedding vector (e.g., a 100-dimensional embedding vector) of stock movement prediction for each news. For instance, in SARL training, the prices of past 30 days can be used as standard state s*. In the bitcoin use case, related prediction labels (e.g., price prediction labels) can be used for state augmentation. In the stock use case, the average news embeddings of past x days (e.g., 12 days) can be used for state augmentation. In case there is no external source at time t, δ can be set to zero. Experiments show that SARL methodology is able to produce more accurately optimized results. For example, SARL is able to incorporate external features for PM, and enhances the robustness of the agent in performing its task.

While the description herein uses financial planning and portfolio management as use cases, SARL can be applicable to learning other like tasks, for example, in which external information can help in better performing a task.

Figure 5:
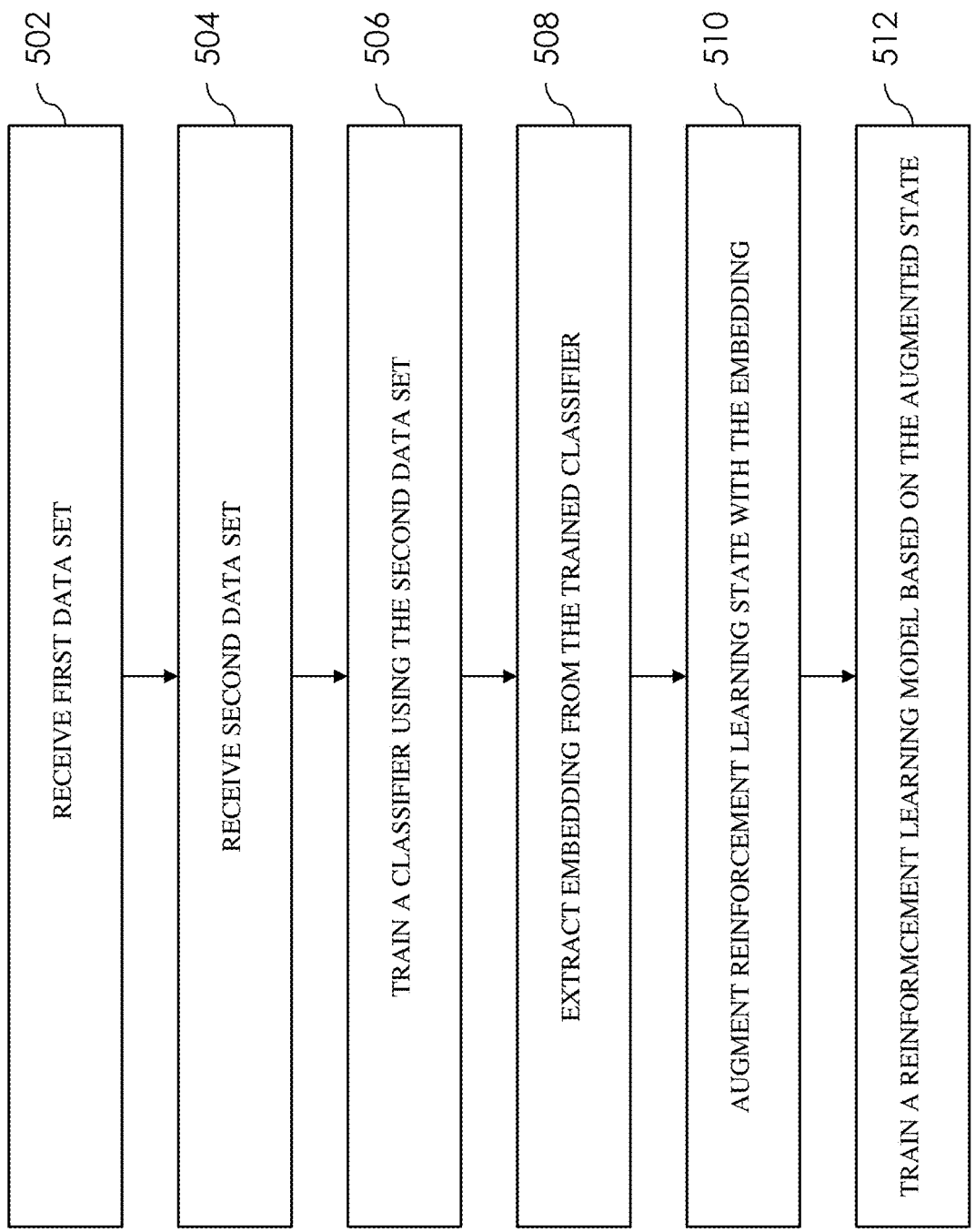
FIG. 5 is a flow diagram illustrating a method in an embodiment.

FIG. 5 is a flow diagram illustrating a method in an embodiment. The method can be run or performed on one or more processors such as hardware processors. At 502, a first dataset (e.g., feature dataset) can be received, which represents an observable state in reinforcement learning, to train a machine to perform an action. An example of an action can be allocating assets in financial planning or portfolio management. For example, in reinforcement learning, a machine learning agent for portfolio management may learn to adjust portfolio based on the collected information.

At 504, a second dataset, for example, which can be a different type of data from the first dataset, can be received. The second dataset, for example, can be any type of data, such as unstructured data (e.g., text, news, social media data), tabular data, graph data, and/or another. For example, a natural language processing can create word embeddings to process unstructured text data, the word embeddings can be used for training the machine learning classifier.

At 506, using at least the second dataset, a machine learning classifier such as a neural network can be trained to make a prediction about an entity related to the action. An example of such prediction can be an asset movement or price movement prediction, for example, about an asset, which asset, for example, is being considered as part of the portfolio. In an embodiment, one or more such second datasets can be received and corresponding one or more different machine learning classifiers can be trained to make the prediction, e.g., price movement.

At 508, an embedding from the trained machine classifier can be extracted. For example, features in the last layer before the softmax layer in the machine learning classifier can be extracted to represent the embedding.

At 510, the observable state is augmented with the embedding to create an augmented state.

At 512, based on the augmented state, a reinforcement learning model is trained to learn a policy for performing the action. The policy can refer to a mapping from state space to action space. In an embodiment, the reinforcement learning model includes deep neural networks.

Figure 6:
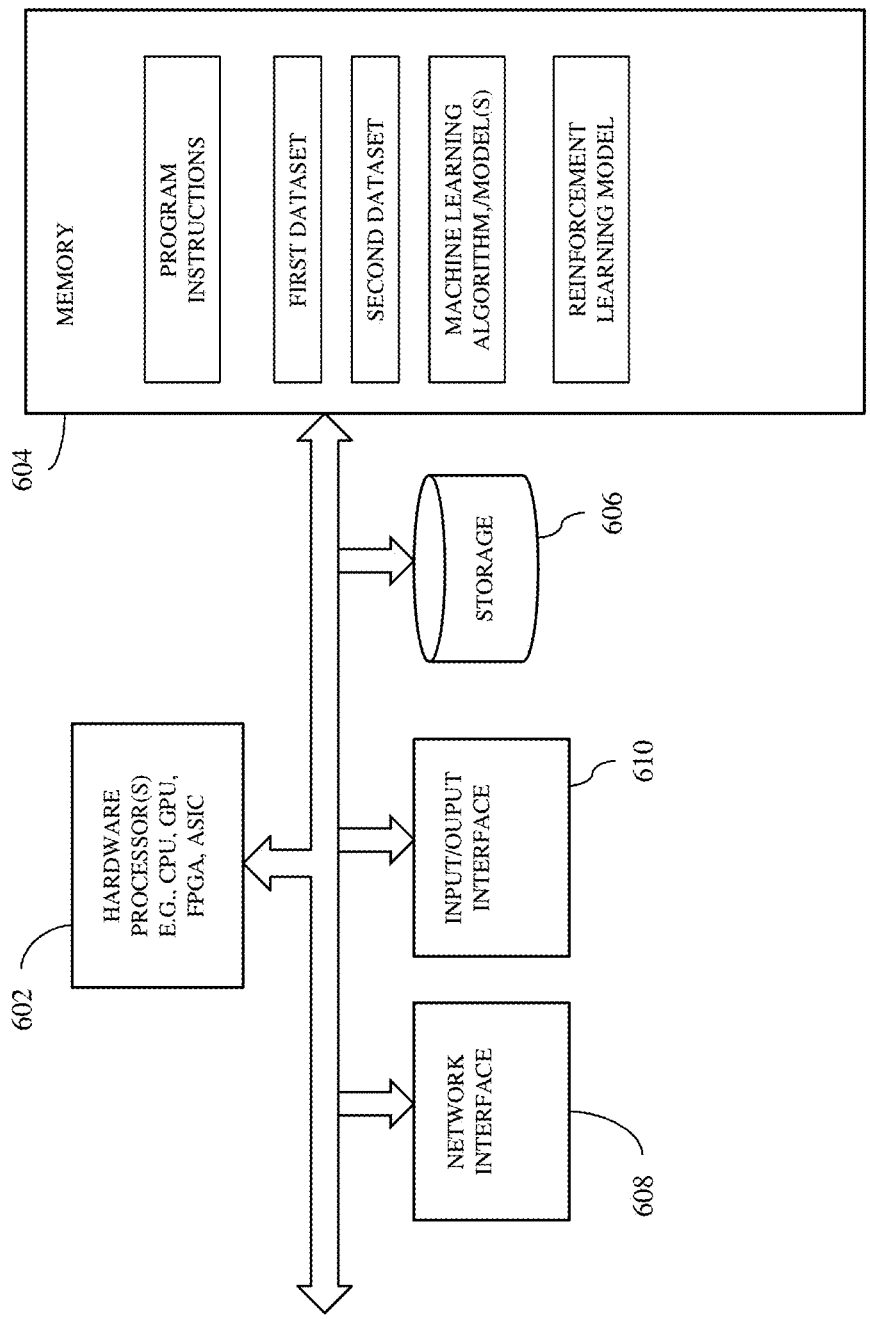
FIG. 6 is a diagram showing components of a system in one embodiment that can perform state-augmented reinforcement learning.

FIG. 6 is a diagram showing components of a system in one embodiment that can perform state-augmented reinforcement learning in an embodiment. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate one or more machine learning classifiers for providing embeddings from diverse data sources, and train a reinforcement learning model to learn to perform an action, for example, using embeddings to augment states. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input including first dataset and second dataset. The first dataset can be used to represent an observable state in reinforcement learning to train a machine to perform an action. The second dataset can represent one or more additional diverse types of data. For instance, at least one hardware processor 602 may train a machine learning classifier using the second dataset to make a prediction about an entity related to the action. A hardware processor 602, for example, may extract an embedding from the trained machine learning classifier and augment the observable state with the embedding to create an augmented state. Based on the augmented state, a hardware processor 602 may train a reinforcement learning model to learn a policy for performing the action. The policy can include a mapping from state space to action space. The first dataset and/or the second dataset may be stored in a storage device 606 or received via a network interface 608 from a remote device, and may be temporarily loaded into a memory device 604 for building or generating one or more models. The learned one or more models may be stored on a memory device 604, for example, for running by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
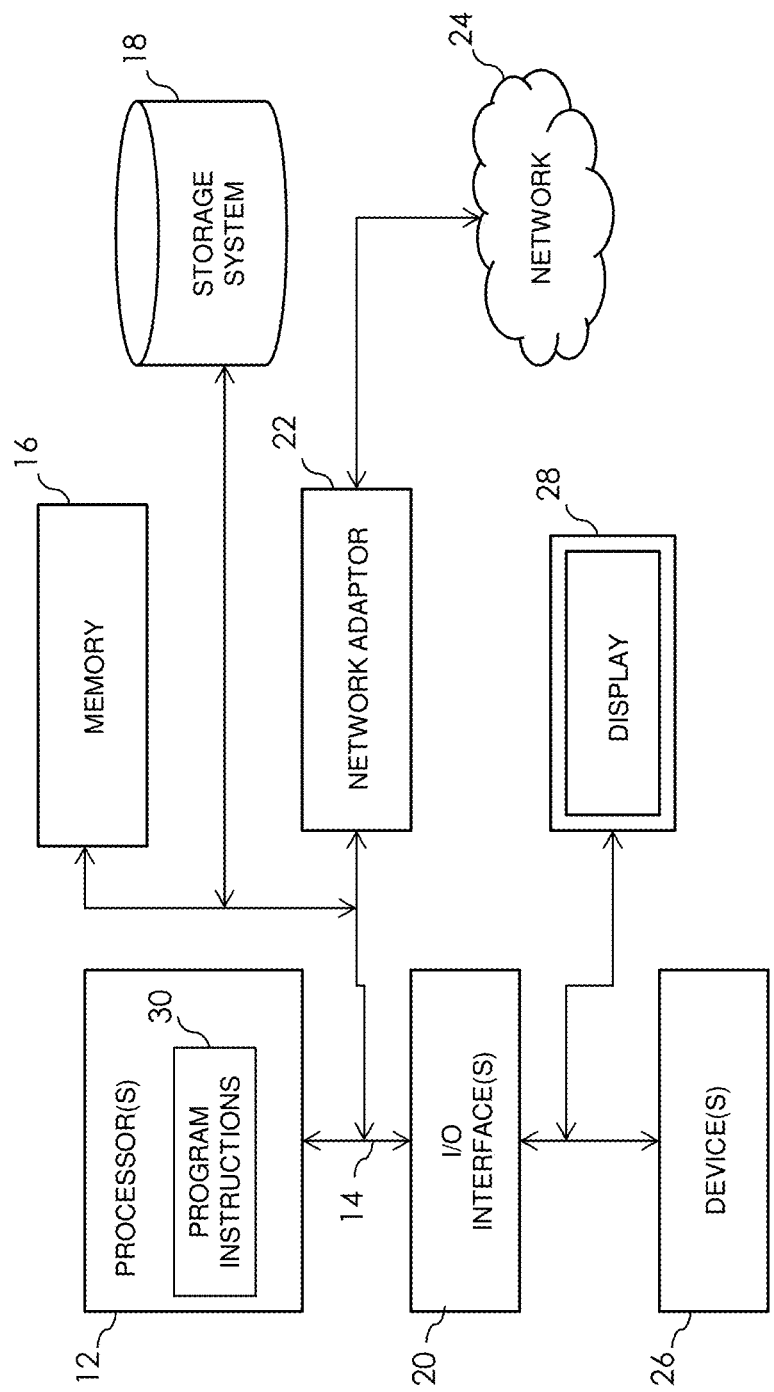
FIG. 7 illustrates a schematic of an example computer or processing system that may implement a state-augmented reinforcement learning system in an embodiment.

FIG. 7 illustrates a schematic of an example computer or processing system that may implement a state-augmented reinforcement learning system in an embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
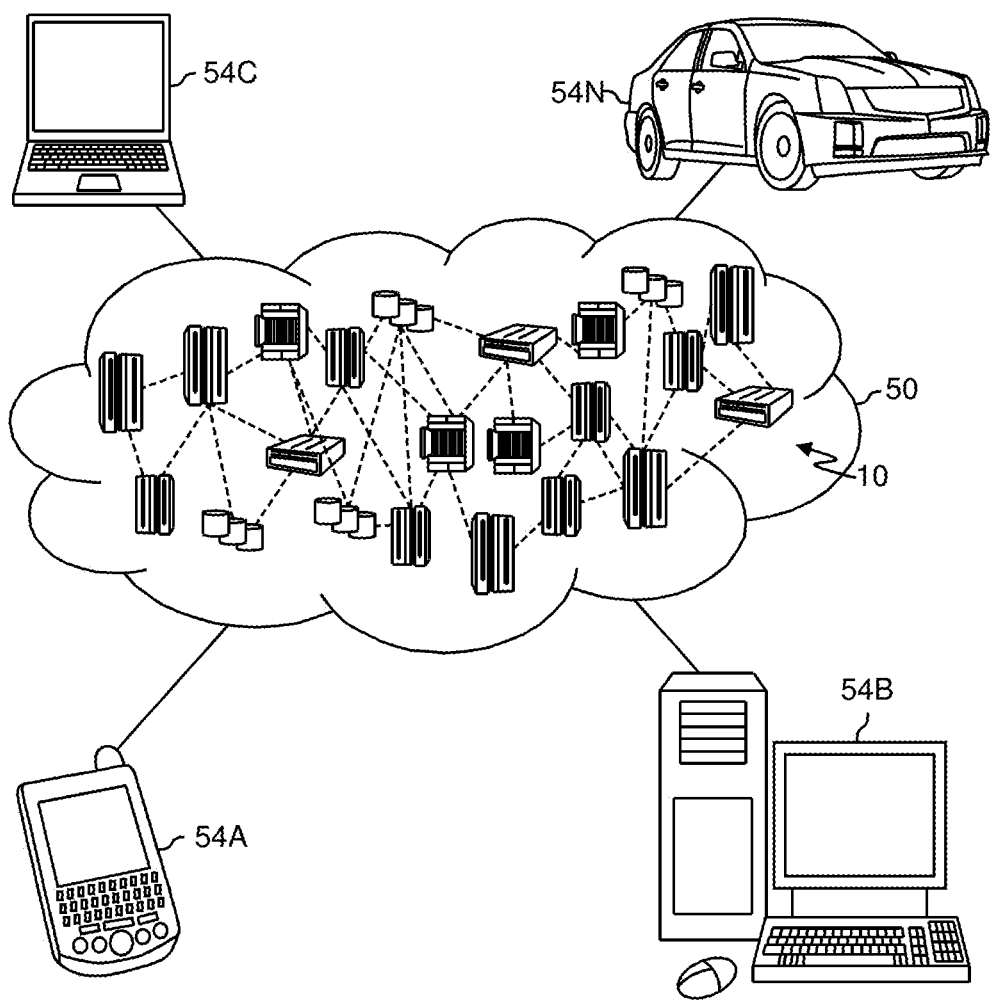
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
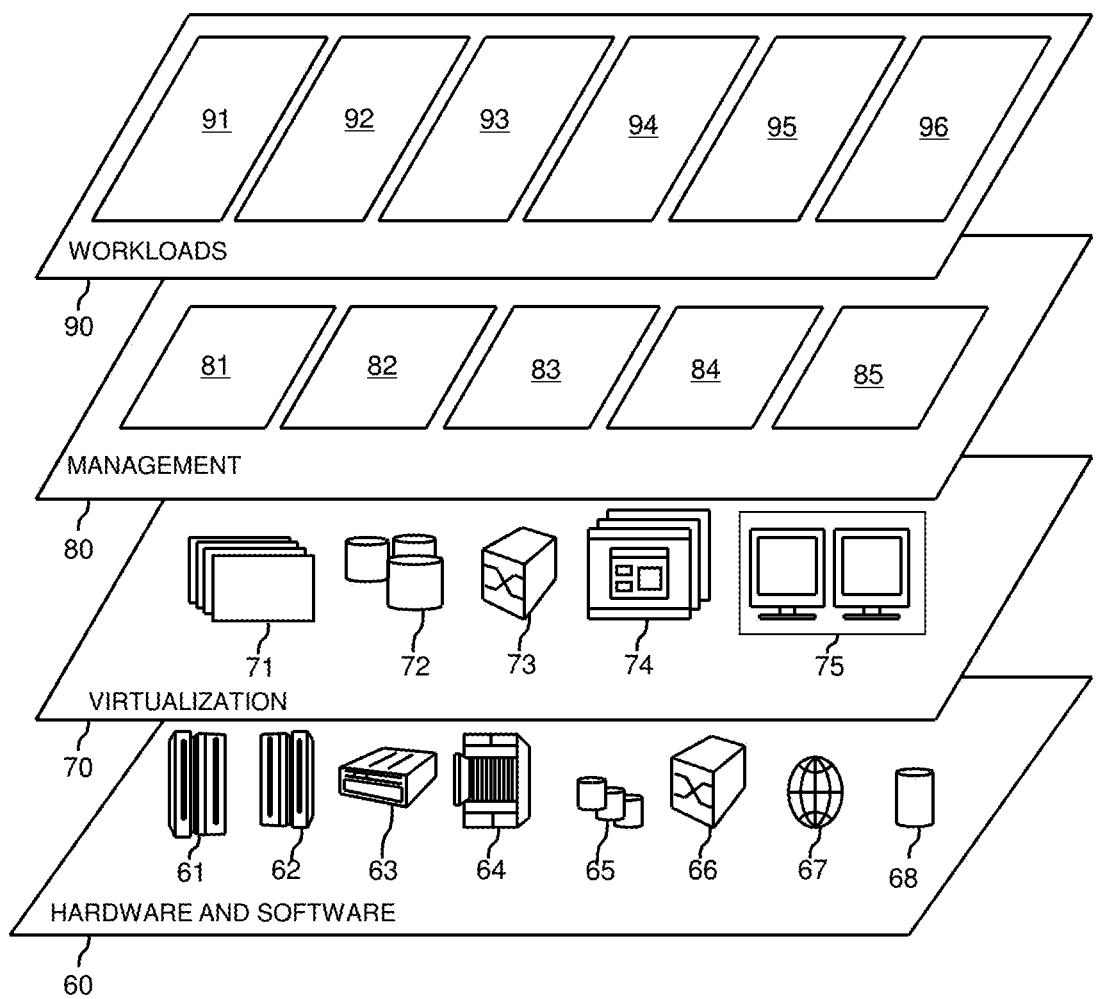
FIG. 9 illustrates a set of functional abstraction layers provided by cloud computing environment in one embodiment.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and state-augmented reinforcement learning processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   receiving a first dataset representing an observable state in reinforcement learning to train a machine to perform an action;
   receiving a second dataset;
   training a machine learning classifier using the second dataset to make a prediction about an entity related to the action;

extracting an embedding from the trained machine learning classifier;
augmenting the observable state with the embedding to create an augmented state; and
based on the augmented state, training a reinforcement learning model to learn a policy for performing the action, the policy including a mapping from state space to action space,
wherein the embedding includes a vector representation of information in heterogeneous form converted by the machine learning classifier into a usable form by the reinforcement learning model.

2. The method of claim 1, wherein a plurality of second datasets are received and a corresponding plurality of different machine learning classifiers are trained to make the prediction about the entity related to the action.

3. The method of claim 1, wherein the second dataset includes unstructured data and a natural language processing creates word embeddings for training the machine learning classifier.

4. The method of claim 1, wherein the reinforcement learning model includes deep neural networks.

5. The method of claim 1, wherein the extracting the embedding from the trained machine learning classifier includes extracting features in the last layer before the softmax layer in the machine learning classifier to represent the embedding.

6. The method of claim 1, wherein the machine learning classifier includes a neural network.

7. The method of claim 1, wherein the prediction about an entity includes asset movement and the action includes asset allocation in portfolio management.

8. A system comprising:
a hardware processor; and
a memory device coupled with the hardware processor;
the hardware processor configured to at least:
  receive a first dataset representing an observable state in reinforcement learning to train a machine to perform an action;
  receive a second dataset;
  train a machine learning classifier using the second dataset to make a prediction about an entity related to the action;
  extract an embedding from the trained machine learning classifier;
  augment the observable state with the embedding to create an augmented state; and
  based on the augmented state, train a reinforcement learning model to learn a policy for performing the action, the policy including a mapping from state space to action space,
  wherein the embedding includes a vector representation of information in heterogeneous form converted by the machine learning classifier into a usable form by the reinforcement learning model.

9. The system of claim 8, wherein a plurality of second datasets are received and a corresponding plurality of different machine learning classifiers are trained to make the prediction about the entity related to the action.

10. The system of claim 8, wherein the second dataset includes unstructured data and a natural language processing creates word embeddings for training the machine learning classifier.

11. The system of claim 8, wherein the reinforcement learning model includes deep neural networks.

12. The system of claim 8, wherein the hardware processor is configured to extract features in the last layer before the softmax layer in the machine learning classifier to represent the embedding.

13. The system of claim 8, wherein the machine learning classifier includes a neural network.

14. The system of claim 8, wherein the prediction about an entity includes asset movement and the action includes asset allocation in portfolio management.

15. A computer program product comprising a computer readable storage medium having program instructions embodied therewith, the program instructions readable by a device to cause the device to:
receive a first dataset representing an observable state in reinforcement learning to train a machine to perform an action;
receive a second dataset;
train a machine learning classifier using the second dataset to make a prediction about an entity related to the action;
extract an embedding from the trained machine learning classifier;
augment the observable state with the embedding to create an augmented state; and
based on the augmented state, train a reinforcement learning model to learn a policy for performing the action, the policy including a mapping from state space to action space,
wherein the embedding includes a vector representation of information in heterogeneous form converted by the machine learning classifier into a usable form by the reinforcement learning model.

16. The computer program product of claim 15, wherein a plurality of second datasets are received and a corresponding plurality of different machine learning classifiers are trained to make the prediction about the entity related to the action.

17. The computer program product of claim 15, wherein the second dataset includes unstructured data and a natural language processing creates word embeddings for training the machine learning classifier.

18. The computer program product of claim 15, wherein the reinforcement learning model includes deep neural networks.

19. The computer program product of claim 15, wherein the device is caused to extract features in the last layer before the softmax layer in the machine learning classifier to represent the embedding.

20. The computer program product of claim 15, wherein the prediction about an entity includes asset movement and the action includes asset allocation in portfolio management.

* * * * *